United States Patent [19]

Numazawa et al.

[11] 4,315,564
[45] Feb. 16, 1982

[54] SYNCHRO-MESH TYPE GEAR TRANSMISSION

[75] Inventors: Akio Numazawa, Nagoya; Nobuaki Katayama, Toyota, both of Japan

[73] Assignee: Toyota Jidosha Kogyo Kabushiki Kaisha, Toyota, Japan

[21] Appl. No.: 92,218

[22] Filed: Nov. 7, 1979

[30] Foreign Application Priority Data

Nov. 15, 1978 [JP] Japan .................. 53/156044

[51] Int. Cl.³ ............................................. F16D 23/04
[52] U.S. Cl. .................................................. 192/53 F
[58] Field of Search ........................... 192/53 F, 53 E

[56] References Cited

U.S. PATENT DOCUMENTS

| | | | |
|---|---|---|---|
| 2,015,841 | 11/1934 | Campbell | 192/53 |
| 2,221,899 | 11/1940 | White et al. | 192/53 F |
| 2,384,439 | 9/1945 | Carnagua et al. | 192/53 |
| 2,814,373 | 11/1957 | Bixby | 192/53 |
| 3,086,633 | 4/1963 | Winter | 192/53 F |
| 3,739,890 | 6/1973 | Nolli | 192/53 E |

FOREIGN PATENT DOCUMENTS

| | | |
|---|---|---|
| 1952597 | 6/1970 | Fed. Rep. of Germany . |
| 1450879 | 10/1972 | Fed. Rep. of Germany . |
| 816500 | 8/1937 | France . |
| 48-536755 | 6/1973 | Japan . |

*Primary Examiner*—Rodney H. Bonck
*Attorney, Agent, or Firm*—Kenyon & Kenyon

[57] ABSTRACT

A synchro-mesh type gear transmission includes a clutch hub rigidly mounted on an output power shaft. The clutch hub is provided with axial slots in which springs are axially inserted. The springs urge a synchronizer ring against a conically tapered surface of a driven shift gear which is mounted on the output power shaft so as to be rotatable. Thus, the synchronizer ring exerts a frictional resistance against rotation of the driven shift gear. A cylindrical sleeve is rigidly inserted in each of the guide slots. Each spring is inserted in a respective cylindrical sleeve so as to be prevented from being deformed in the direction in which the synchronizer ring rotates. A guide rod may be inserted in the cylindrical coil spring disposed in the cylindrical sleeve as a further support against deformation.

7 Claims, 9 Drawing Figures

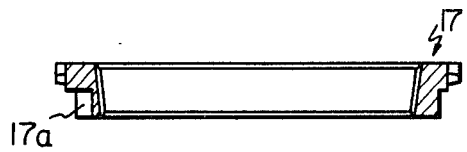
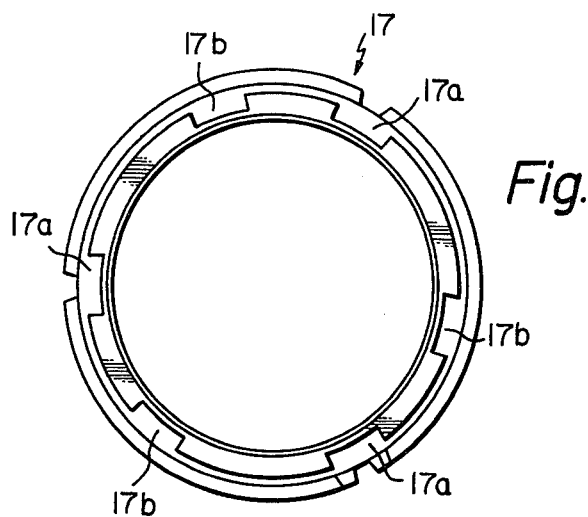
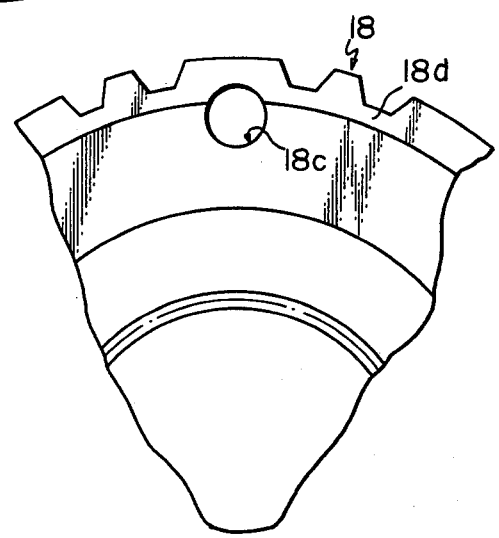

SYNCHRO-MESH TYPE GEAR TRANSMISSION

BACKGROUND OF THE INVENTION

This invention relates to synchro-mesh type gear transmissions of the type used in motor vehicles, and more particularly, to a gear transmission provided with means for the reduction of gear backlash noise.

In engines for motor vehicles, the speed of engine rotation and the corresponding output torque vary over a large range. Gear-type power transmissions which are generally used with such engines produce annoying gear backlash noise which cannot be ignored. The gear backlash noise is not very significant when the engine is running at high speed, because during such operation the rotation speed and torque vary over a relatively small range, while air intake suction noises, and exhaust noises, are louder than when the engine is rotating at low speed. However, when the vehicle is stopped and the engine is idling, even small variations in the actual speed of rotation of the engine are relatively larger than when the engine is operating at high speed. During such low speed operation, large relative speed differentials may occur between an input gear and a counter input gear which is in direct engagement with the input gear, thereby producing relatively loud gear backlash noise.

The magnitude of gear backlash noise is related to frictional resistance, which is affected by the viscosity of the lubrication oil. For example, as the temperature of the lubrication oil increases, and the frictional resistance between transmission components decreases below a certain value, gear backlash noise is generated.

An improved synchro-mesh type gear transmission which reduces gear backlash noise has been proposed in Japanese Utility Model Publication No. 53-6755. The transmission described therein is provided with a clutch hub having axial slots in which springs are inserted. The springs urge a synchronizer ring against a conically tapered surface of a shift gear, thereby exerting a frictional resistance against the movement of the shift gear. However, in this known gear transmission, no means are provided for guiding the springs, thereby allowing the springs to be disadvantageously deformed in the direction in which the synchronizer ring rotates.

It is, therefore, an object of the present invention to provide a new and improved synchro-mesh type gear transmission which eliminates the possibility of undesired spring deformation.

It is another object of the present invention to provide a new and improved synchro-mesh type gear transmission which includes spring means for exerting a frictional resistance by urging a synchronizer ring against a driven shift gear, in such a manner that gear backlash noise is eliminated while the spring means are prevented from being undesirably deformed.

SUMMARY OF THE INVENTION

The foregoing and other objects are achieved by this invention which provides a synchro-mesh type gear transmission having a clutch hub rigidly mounted on an output power shaft, the clutch hub being provided with axial guide slots in which springs are axially inserted. The springs urge a synchronizer ring against a conically tapered surface of a driven shift gear which is mounted on the output power shaft so as to be freely rotatable. Thus, the synchronizer ring exerts a frictional resistance against the rotation of the driven shift gear. A sleeve member is provided which is in constant meshing engagement with the clutch hub and which selectively engages the desired driven shift gear. A guide member for guiding and retaining each spring is inserted in each guide slot so that said spring is prevented from being deformed in the direction in which the synchronizer ring rotates.

BRIEF DESCRIPTION OF THE DRAWINGS

FIG. 5 is a cross-sectional view of a synchronizer ring which may be used in a gear transmission according to the present invention;

FIG. 6 is a plan view of the synchronizer ring illustrated in FIG. 5;

FIG. 7 is a fragmented plan view of a clutch hub which may be used in a gear transmission according to the present invention;

DETAILED DESCRIPTION OF A PRIOR ART GEAR TRANSMISSION

A synchronizer mechanism of a synchro-mesh type gear transmission (i.e., a Borg-Warner type gear transmission) is well known from prior art. Thus, a detailed description concerning the construction and operation thereof will not be provided. A gear transmission disclosed in the above-mentioned Japanese Utility Model Publication No. 53-6755, in which a frictional resistance is exerted on a driven shift gear by means of a spring, will be briefly described.

Figure 9:
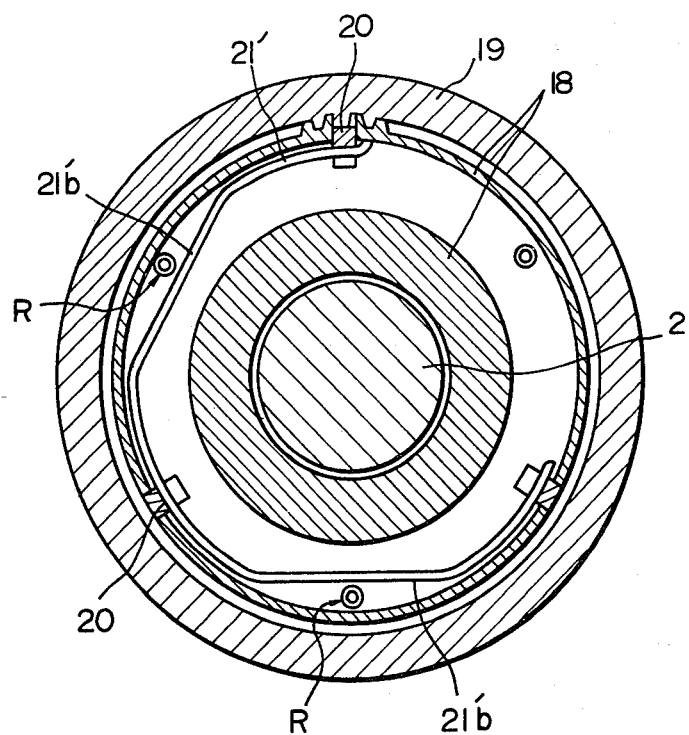
FIG. 9 is a cross-sectional view taken along line IX—IX in FIG. 8.

In FIGS. 9 and 10, a clutch hub 18 is provided with axially extending slots 18c which are angularly situated 120° apart and positioned corresponding to the periphery of a pair of synchronizer rings 16 and 17. Each slot 18c contains a compression spring R, the ends of which contact respective ones of synchronizer rings 16 and 17. Springs R softly urge rings 16 and 17 against conically tapered surfaces 6b and 7b of gears 6 and 7, respectively. The magnitude of the total spring expansion force of springs R which is applied against synchronizer rings 16 and 17 need be only enough to apply a small frictional resistance against gears 6 and 7. Shifting keys 20 are urged radially outward by a plurality of key spring 21'. The spring expansion force of key springs 21' must be sufficient to urge synchronizer rings 16 and 17 against conically tapered surfaces 6b and 7b of gears 6 and 7, respectively, by means of shifting keys 20, when the synchronizer mechanism is operated. During such operation, a phase differential is present between the rotation of an inner set of spline teeth of a sleeve 19, and the rotation of the outer sets of spline teeth of synchronizer rings 16 and 17, respectively. The substantially circular key springs 21' have straight portions 21'b which are radially inwardly deformed, as illustrated in FIG. 10, so as to permit springs R to be disposed in axial slots 18c, without interference by key springs 21'.

Figure 8:
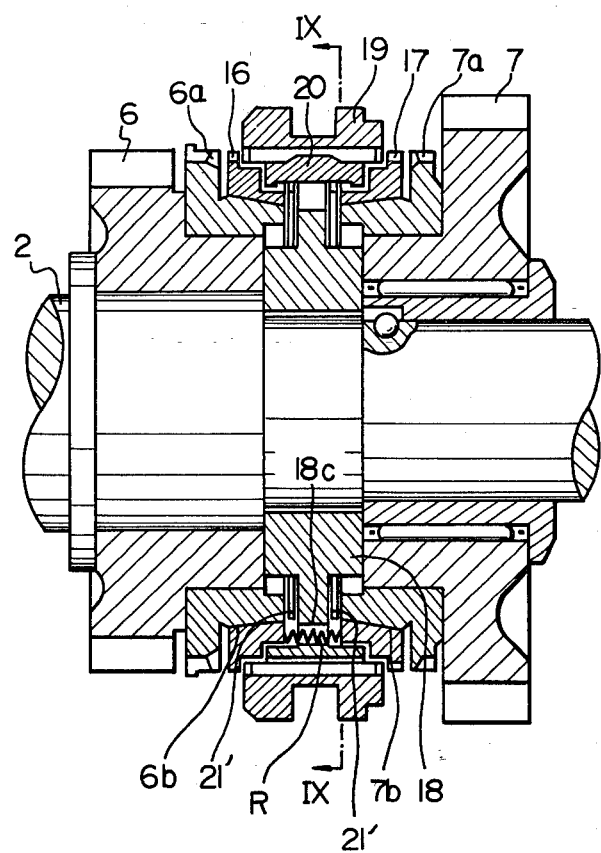
FIG. 8 is a partial cross-sectional view of a conventionally known gear transmission.

In the neutral position as shown in FIG. 8 if the vehicle is stopped, an output power shaft 2 is not rotated. However, an input power shaft (not shown in the drawings) is rotated through a main clutch assembly by an engine (not shown) which is idling. Counter gears (not shown), which are mounted on a counter shaft (not shown) are always rotated by an input gear (not shown) which is rigidly mounted on, or integrally formed with, the input power shaft, and the shift gears 6 and 7 which are in constant meshing engagement with the counter gears, are always freely rotated on output power shaft 2. The synchronizer rings 16 and 17 are softly urged against conically tapered surfaces 6b and 7b of shift gears 6 and 7, respectively, by means of springs R, so that a frictional resistance is exerted on shift gears 6 and 7. The frictional resistance is transmitted to the counter gears, which are rigidly mounted on the counter shaft and are in constant engagement with shift gears 6 and 7, and is subsequently transmitted to the input gear, thereby preventing gear backlash noise from being produced when the engine is idling so that the relative change of speed of rotation, or turning torque, is very large.

Guide slots 18c, in which springs R are respectively inserted, are axially formed at the relatively thin flange wall portion of the clutch hub 18, so that the springs R are not fully retained or guided in the slots 18c along the entire axial length of the springs R. Therefore, when a shift lever is manually operated, and a selectable one of synchronizer rings 16 and 17 is synchronized with respect to clutch hub 18, springs R tend to deform in the direction in which the selected synchronizer ring rotates, and thus, the shift operation tends to be neither softly nor smoothly carried out.

DESCRIPTION OF THE PREFERRED EMBODIMENTS

Referring now to FIGS. 1 through 4, several embodiments of the present invention are illustrated, in which guide members 25 through 28, which are provided for retaining and guiding springs R, are inserted in guide slots 18c so that springs R are prevented from being deformed in the direction in which a synchronizer ring 16 or 17 rotates.

Figure 1:
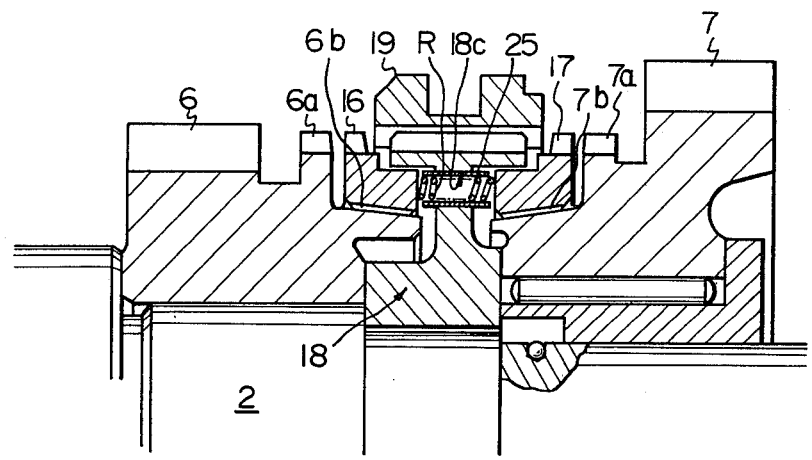
FIG. 1 is a partial cross-sectional view of an embodiment of a gear transmission of the present invention.
Figure 2:
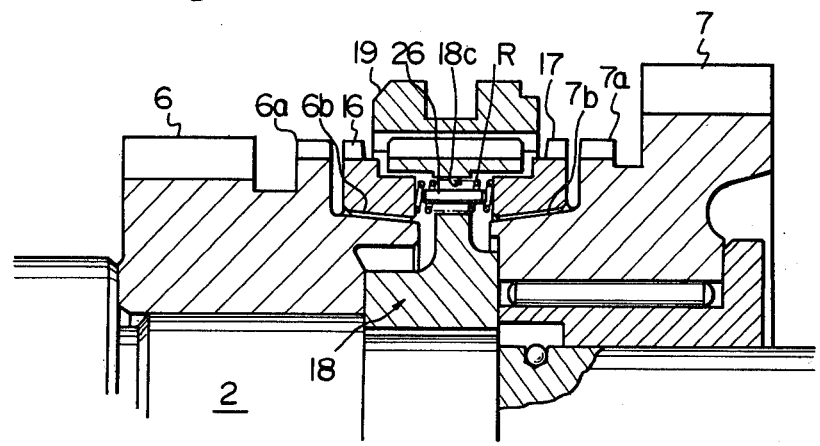
FIG. 2 is a partial cross-sectional view of another embodiment of the present invention.

In the embodiment illustrated in FIG. 1, cylindrical sleeves 25, which are open at the both ends thereof, are each rigidly and axially inserted in a corresponding one of axial guide slots 18c which are formed in a clutch hub 18. Springs R are each disposed in respective sleeves 25. In the embodiment illustrated in FIG. 2, guide rods 26 are axially inserted within cylindrical coil springs R which are disposed in the axial guide slots 18c formed in clutch hub 18. In the embodiments of FIGS. 1 and 2, cylindrical sleeves 25 or guide rods 26 guide springs R along their entire axial length. Thus, when either synchronizer ring 16 or 17 is being synchronized with respect to clutch hub 18, springs R are prevented from being deformed in the direction in which the selected synchronizer ring rotates. Therefore, the required shift force is reduced, while the shift operation can be smoothly carried out when a shift lever (not shown) is manually operated.

Figure 3:
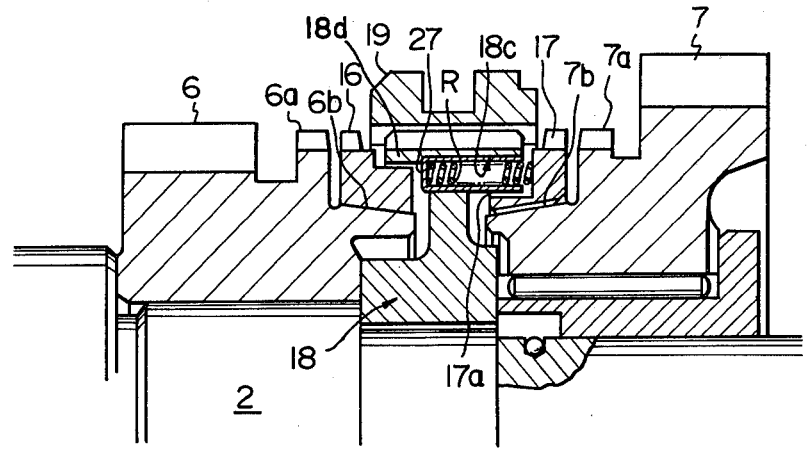
FIG. 3 is a partial cross-sectional view of a further embodiment of the present invention.

In the embodiment illustrated in FIG. 3, guide slots 18c are axially formed in clutch hub 18 in such a manner that one end of each of the guide slots is opened while the other end thereof is closed, and at least a portion of the inner wall of each guide slot 18c is in a flange portion 18d which forms an outwardly spline-toothed gear portion of clutch hub 18. Rigidly inserted in guide slots 18c are respective cylindrical sleeves 27 which are also opened at one end and closed at the other. The bottom walls of guide slots 18c hold cylindrical sleeves 27, which contain springs R, firmly in place.

Figure 4:
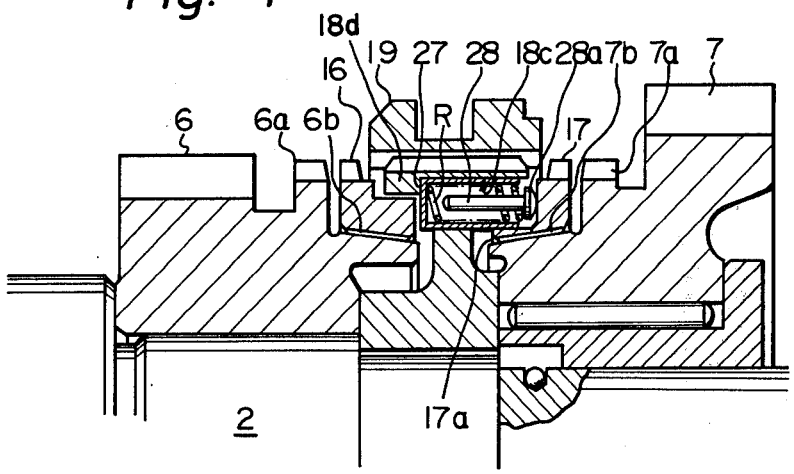
FIG. 4 is a partial cross-sectional view of still another embodiment of the present invention.

In the embodiment illustrated in FIG. 4, axial guide rods 28 each having a head portion 28a, are axially inserted in coil springs R of the embodiment illustrated in FIG. 3. Head portions 28a of guide rods 28 are pushed by the springs R and urge synchronizer ring 17 against a corresponding conically tapered surface 7b of shift gear 7. For this purpose, head portions 28a of guide rods 28 have a round shape at the right hand side thereof as viewed in FIG. 4.

In the embodiments illustrated in FIGS. 3 and 4, springs R urge only synchronizer ring 17 toward its corresponding conically tapered surface 7b of shift gear 7, which corresponds to a lower speed than gear 6. This permits a reduction in the required shift force when a shift mechanism (not shown) is manually operated from a higher speed to a lower speed. Moreover, in the embodiments illustrated in FIGS. 3 and 4, synchronizer ring 17 is provided with a plurality of guide recesses 17a at the portions thereof to which the springs R extend. Such a synchronizer ring is illustrated in detail in FIGS. 5 and 6. Springs R are retained and guided by recesses 17a, in addition to guide members 27 and/or 28.

The dimensions of recesses 17a in the peripheral direction are larger than either the cylindrical outer diameter of coil springs R, or the width of a shifting key 20. This permits some rotation of the synchronizer ring, with respect to the clutch hub, so as to facilitate the synchronization operation. In view of the increased guide length which results from guide recesses 17a, relatively long springs R, which are easily designed and arranged, must be used.

If guide slots 18c are formed in clutch hub 18 so that at least a portion of the inner wall of each guide slot 18c is in flange portion 18d of clutch hub 18, as mentioned above, and if the radial thickness of flange portion 18d is relatively small, the portions of flange portion 18d near guide slots 18c may be formed without spline teeth, as shown in FIG. 7. This will permit the use of coil springs having larger diameters than would be permissible with completely spline-toothed clutch hubs.

Although the inventive concept disclosed herein has been described in terms of specific embodiments and applications, other embodiments and applications would be obvious to persons skilled in the art in light of this teaching, without departing from the scope of the invention. The description and drawings of specific embodiments are illustrative of applications of the invention and should not be construed to limit the scope thereof.

What is claimed is:

1. A synchro-mesh gear transmission of the type having a clutch hub which is rigidly mounted on an output power shaft, the clutch hub being provided with axial slots in which springs are axially inserted, the springs being arranged so as to urge a synchronizer ring against a conically tapered surface of a driven shift gear, the driven shift gear being mounted on the output power shaft so as to be rotatable with respect to the output power shaft, the synchronizer ring thereby exerting a frictional resistance against rotation of the driven shift gear, the driven shift gear being selectively coupled to the clutch hub by a sleeve member which is in constant meshing engagement with the clutch hub, the transmission being characterized in that there is further provided at least one guide member means in the form of a cylindrical sleeve which is held immobile in one of the axial slots in the clutch hub, one of the springs being inserted in said guide member means, so that said guide member means supports the spring therein against deformation in response to a rotational motion of the synchronizer ring.

2. The transmission set forth in claim 1 wherein said guide member means is in the form of a cylindrical sleeve which is closed at one end, and open at another end so as to permit the spring therein to communicate with the synchronizer ring.

3. The transmission set forth in claim 1 or 2 wherein the spring is of the cylindrical coil type, the transmission further comprising guide rod means having a predetermined axial length, said guide rod means being axially disposed within the cylindrical coil spring so that a portion of said predetermined length of said guide rod means extends axially outward of said guide member means.

4. The transmission set forth in claim 3 wherein said guide rod means is provided at an end thereof, which extends axially outward of said guide member means, with a rounded head portion, said rounded head portion being disposed substantially outside of said guide member means, for urging the synchronizer ring against the conically tapered surface of the driven shift gear.

5. The transmission set forth in claim 1 wherein the synchronizer ring is provided with a guide recess at a predetermined portion thereof so that the spring is supported against deformation in response to said rotational motion of the synchronizer spring by the combination of said guide recess and said guide member means.

6. The transmission set forth in claim 1 wherein the axial slot in which said guide member means in the form of a cylindrical sleeve is held immobile has an inside wall which is partially disposed in a peripheral flange portion of the clutch hub, said peripheral flange portion having an outer perimeter having at least one spline-toothed portion.

7. The transmission set forth in claim 6 wherein said peripheral flange portion of the clutch hub has an untoothed portion on said outer perimeter, said untoothed portion being near said inside wall of the axial slot which holds said guide member means.

* * * * *

UNITED STATES PATENT AND TRADEMARK OFFICE
CERTIFICATE OF CORRECTION

PATENT NO. : 4,315,564
DATED : February 16, 1982
INVENTOR(S) : Akio Numazawa and Nobuaki Katayama It is certified that error appears in the above—identified patent and that said Letters Patent is hereby corrected as shown below:

Col. 2, line 42, change "9 and 10" to --8 and 9--.

Col. 3, line 65, after "slots" insert --18c--.

Signed and Sealed this

Thirty-first Day of August 1982

[SEAL]

Attest:

GERALD J. MOSSINGHOFF

*Attesting Officer*     *Commissioner of Patents and Trademarks*